United States Patent
Crowell

[19]

[11] Patent Number: 6,123,462
[45] Date of Patent: Sep. 26, 2000

[54] BEARING SYSTEM HAVING REDUCED NOISE AND AXIAL PRELOAD

[75] Inventor: James R. Crowell, Huntertown, Ind.

[73] Assignee: General Electric Company, Schenectady, N.Y.

[21] Appl. No.: 09/162,307

[22] Filed: Sep. 28, 1998

[51] Int. Cl.[7] ................................ F16C 23/06
[52] U.S. Cl. ..................... 384/517; 384/519; 384/540
[58] Field of Search ................... 384/517, 518, 384/519, 537, 540, 559–563, 583, 584, 585

[56] References Cited

U.S. PATENT DOCUMENTS

| | | | |
|---|---|---|---|
| 675,975 | 6/1901 | Riebe | 384/495 |
| 2,711,356 | 6/1955 | Ensinger | 384/517 |
| 2,858,174 | 10/1958 | Mitchell | 384/495 |
| 2,962,912 | 12/1960 | Hirschle | 384/518 X |
| 3,001,839 | 9/1961 | Horberg | 384/518 |
| 3,214,224 | 10/1965 | Lash | 384/517 |
| 3,738,719 | 6/1973 | Langner | 384/517 |
| 3,955,861 | 5/1976 | Orain | 384/495 |
| 4,116,506 | 9/1978 | Moritomo et al. | 384/518 |
| 4,211,454 | 7/1980 | Mitchell et al. | 384/517 |
| 4,519,734 | 5/1985 | Mitchell et al. | 384/490 X |
| 4,523,864 | 6/1985 | Walter et al. | 384/613 |
| 4,551,032 | 11/1985 | Mottershead | 384/517 |
| 4,555,190 | 11/1985 | Lederman | 384/495 |
| 4,563,099 | 1/1986 | Brandenstein et al. | 384/458 |
| 4,575,263 | 3/1986 | Foldhazy et al. | 384/126 |
| 4,577,981 | 3/1986 | Kimura | 384/495 |
| 4,611,351 | 9/1986 | Nakamura | 384/99 |
| 4,626,111 | 12/1986 | Swasey et al. | 384/99 |
| 4,641,558 | 2/1987 | Hoffmann | 384/563 X |
| 4,695,102 | 9/1987 | Crotti | 384/517 X |
| 4,699,528 | 10/1987 | Gotman | 384/536 |
| 4,718,781 | 1/1988 | Gerard | 384/495 |
| 4,726,696 | 2/1988 | Dickinson et al. | 384/477 |
| 4,732,495 | 3/1988 | Brandenstein et al. | 384/518 |
| 4,741,091 | 5/1988 | Settles | 384/537 X |
| 4,798,523 | 1/1989 | Glaser et al. | 384/518 X |
| 4,808,013 | 2/1989 | Waddington | 384/495 |
| 4,904,095 | 2/1990 | Fournier et al. | 384/517 |
| 4,915,514 | 4/1990 | Soderlund | 384/616 |
| 4,966,474 | 10/1990 | Geiger | 384/517 |
| 4,993,851 | 2/1991 | Nakanishi | 384/512 |
| 5,030,016 | 7/1991 | Shoeffter | 384/448 |
| 5,046,870 | 9/1991 | Ordo | 384/563 |
| 5,051,005 | 9/1991 | Duncan | 384/517 |
| 5,094,551 | 3/1992 | Kitamura et al. | 384/518 |
| 5,207,514 | 5/1993 | Weissgerber | 384/497 |
| 5,316,393 | 5/1994 | Daugherty | 384/517 |
| 5,433,536 | 7/1995 | Bergling | 384/620 |
| 5,463,861 | 11/1995 | Lorenz | 384/504 X |
| 5,494,359 | 2/1996 | Del Rio et al. | 384/518 |
| 5,547,291 | 8/1996 | Miyazaki et al. | 384/512 |
| 5,577,847 | 11/1996 | Nakamura et al. | 384/517 |
| 5,590,968 | 1/1997 | Dretzka | 384/563 |
| 5,639,167 | 6/1997 | Hans et al. | 384/476 |
| 5,690,395 | 11/1997 | Hicks | 384/624 X |

*Primary Examiner*—Thomas R. Hannon
*Attorney, Agent, or Firm*—Carl Horton, Esq.; Damian Wasserbauer, Esq.; Armstrong Teasdale LLP

[57] ABSTRACT

A bearing system includes a housing with first and second relief cuts, and a bearing assembly that includes an inner race and an outer race. An adjust screw contacts a preload spring positioned adjacent the outer race. The preload spring exerts a force on the outer race. The outer race includes a first and second edge, and a connecting portion. The first and second edges are positioned adjacent the first and second relief cuts respectively. The connecting portion contacts a bearing bore surface while the first and second edges of the outer race do not contact the bore surface.

21 Claims, 7 Drawing Sheets

BEARING SYSTEM HAVING REDUCED NOISE AND AXIAL PRELOAD

BACKGROUND OF THE INVENTION

This invention relates generally to bearing systems and, more particularly, to an apparatus and method for providing an axial preload on a bearing system.

One of the factors affecting bearing noise is the relative internal clearance within the bearing. The internal clearance of a deep groove ball bearing is typically expressed as the radial clearance between the inner raceway, balls, and outer raceway. Decreasing the internal clearance improves the contact between the balls and raceways. Decreased internal clearance also reduces the permissible temperature range for satisfactory operation. Machines expected to operate over wide temperature ranges must have increased internal clearance in the bearing compared to machines operating over relatively small temperature ranges.

Large internal clearances often produce increased noise and heat generation for bearings that have a large diameter or are for high speed operation, or both. The noise is the result of the balls moving into and out of the load region. When entering the load region the ball spin must match the linear velocity of the raceway. Upon leaving the load region, friction on the ball and cage will often slow the ball spin rate. The result can be an operating region where the ball momentarily skids or slides on the raceway when entering the load region of the bearing. This skidding or sliding often produces noise and additional heat generation within the bearing, leading to shortened bearing life. In bearings with ball guided cages, additional noise and heat may also be generated by the cage. Other factors affecting the skidding or sliding between the ball and raceway include lubricant viscosity, cage structure, and the precision of the balls and raceway surfaces.

An axial preload force is often recommended by the bearing manufacturer to maintain stable contact within the ball and raceway regions. The effect of the axial preload is to produce a small angle between the ball and raceway contact points and the rotating axis of the bearing. The angle is called the bearing contact angle. The axial preload also reduces the operating radial clearance within the bearing. The magnitude of the required axial preload force is a function of bearing size, speed range, lubricant viscosity, and loading. There is a minimum axial preload force that will effectively reduce bearing noise. Providing a consistent axial preload is often difficult due to tolerances and manufacturing processes. In order to provide a minimum preload at all times, a substantially larger preload often must be selected in order to account for the worst case system variability. In addition, a lower nominal preload force yields improved bearing life.

A common method for providing the axial preload force in a motor is to provide a spring pack outboard of one bearing, and provide a solid support for the outboard side of the opposite end bearing. In this configuration, the axial preload force is obtained by controlling the compressed height of the preload spring. The spring force is applied to the outer race of the bearing and is transmitted across the outer raceway and ball to the inner race through the contact angle. Similarly the force passes through the opposite end bearing from inner raceway to ball to outer raceway through the contact angle.

Additional forces may affect the axial preload applied to the bearing. Specifically, the preload spring end bearing will experience a force equal to the vector sum of the spring force and friction force occurring between the bearing outer race and support housing bore, and a sticking force occurring between the outer race and the support housing bore. Similarly, the bearing opposite the preload spring will be subjected to an axial force that is the vector sum of the preload spring force, the friction force, the sticking force, and any magnetic and application forces. Assuming that the axial components of magnetic and application forces are zero, the axial preload on either bearing is equal to the vector sum of the preload spring force, the friction force, and the sticking force.

Accordingly, since a minimum axial preload force reduces bearing noise and excessive force leads to shortened bearing life, it would be desirable to minimize the friction and sticking forces. Also, it would be desirable to simplify the fabrication process of the bearing system. Further, it would be desirable if the contact angle could be adjusted within the bearing.

BRIEF SUMMARY OF THE INVENTION

These and other objects may be attained by a bearing system that includes a bearing housing with an opening and a bearing bore having a surface including a first relief cut and a second relief cut. In addition, the bearing system includes a bearing configured to support a rotatable shaft. The bearing is positioned within the bearing bore and includes an inner race, an outer race, and a plurality of balls. A preload spring is positioned adjacent the outer race and a first end of the spring exerts a preload force on the outer race. An adjust screw is placed in the housing opening and contacts a preload adjust plate that is positioned adjacent a second end of the preload spring. The adjust screw can be manipulated to increase and decrease the force exerted on the outer race by the spring.

The bearing outer race includes a first edge, a second edge, and a connecting portion. The bearing outer race is positioned in the bearing housing to allow the outer race first edge to be positioned at the first relief cut and the outer race second edge to be positioned at the second relief cut. The connecting portion of the outer race contacts the bearing bore surface while the first and second edges of the outer race do not contact the bearing bore surface.

A method for assembling the bearing system in an electric motor includes the steps of positioning the preload adjust plate, preload adjust screw, and the preload spring in the end shield assembly. The end shield assembly includes the end shield and the bearing housing. The bearing is positioned on a rotor shaft, and the inner race is press fit onto the shaft. The shaft is then inserted into the end shield assembly and is positioned to allow the first and second edges of the outer race to overlap the first and second relief cuts respectively. The relief cuts prevent the edges of the outer race from contacting the bearing bore during normal operation of the bearing system.

The preload spring is then adjusted to contact the outer race. The preload spring is adjusted by turning the adjust screw to provide a preload force to the spring that is then transmitted to the outer race of the bearing. The preload force moves the outer race to establish a contact angle within the bearing.

An alternative and simplified assembly can be constructed as previously described except that the pre-load adjust screws and plate are replaced by a shoulder or step machined into the bearing housing. The shoulder or step provides axial support for the pre-load spring, and the location of the machined shoulder or step is such that when the motor is fully assembled, the pre-load spring is compressed sufficiently to provide the desired pre-load force.

The combination of a preload spring acting on a bearing and the bearing bore including relief cuts is simple to manufacture since the relief cuts are relatively easy to machine and since the bearing bore surface does not need to have a polished surface. There is reduced edge loading of the bearing and reduced misalignment of the bearing that is normally caused by sticking of the outer race. In addition, sticking forces due to edge contact with the bearing bore surface are reduced and edge loading of the bearing is also reduced. Further, a more consistent axial preload force is applied to the bearing. Still further, by eliminating the contact of the bearing edges with the bearing bore, a more consistent surface contact is achieved during the various thermal cycles that the bearing system experiences during normal operation.

DETAILED DESCRIPTION OF THE INVENTION

Figure 1:
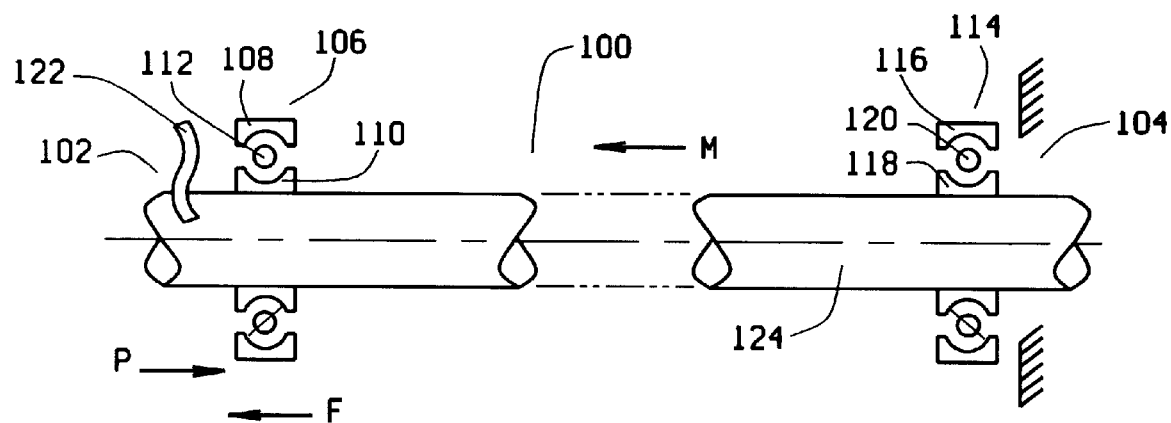
FIG. 1 is a schematic view of a well known bearing system that includes an axial preload.

FIG. 1 is a schematic view illustrating a preload force P being applied to a bearing system 100. Bearing system 100 includes a preload spring end 102 and an opposite preload end 104. Preload spring end 102 includes a first bearing 106 including an outer race 108, an inner race 110, and at least one ball 112. Opposite preload end 104 includes a second bearing 114 including an outer race 116, an inner race 118, and at least one ball 120. Bearing system 100 further includes a preload spring 122. A shaft 124 extends through bearing system 100 and is rotatably supported thereby. Shaft 124 is connected to an electric motor (not shown). A friction force F acts in opposition to preload force P and a magnetic force M acts in concert with friction force F.

The bearing load at preload spring end 102 is equal to preload force P less friction force F. Preload force P at preload spring end 102 is equal to the preload spring force. Friction force F at preload spring end 102 is equal to the vector sum of a friction force occurring between outer race 108 and a support housing bore (not shown), and a sticking force occurring between outer race 108 and the support housing bore.

Similarly, the bearing load at opposite preload end 104 is equal to preload force P less the combination of friction force F and magnetic force M. Preload force P at opposite preload end 104 is equal to the preload spring force. Friction force F at opposite preload end 104 is equal to the vector sum of a friction force occurring between outer race 108 and a support housing bore (not shown) and a sticking force occurring between outer race 108 and the support housing bore. In addition, magnetic force M includes magnetic and application forces acting on shaft 124. When the axial components of magnetic force M are zero, the axial preload on either bearing 106, 114 is equal to the vector sum of preload spring force P and friction force F.

Figure 2A:
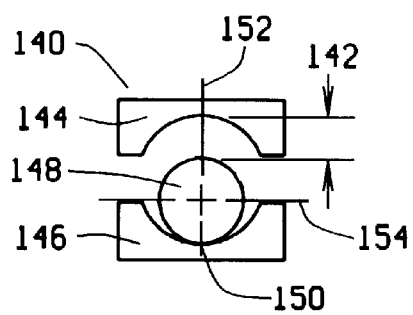
FIG. 2A is a schematic view of a well known bearing.

FIG. 2A is a schematic view of a well known bearing 140 illustrating a radial clearance 142 sometimes present in bearings. Bearing 140 includes an outer race 144, an inner race 146, and at least one ball 148. Ball 148 contacts inner race 146 at a point 150. A contact axis 152 extends through a center of ball 148 and through contact point 150. The angle between contact axis 152 and a line perpendicular to the bearing rotation axis is referred to as contact angle 140. In FIG. 2A, the contact angle is zero. Radial clearance 142 exists between ball 148 and outer race 144 since outer race 144 does not contact ball 148. An axis of rotation 154 is substantially perpendicular to contact axis 152.

Figure 2B:
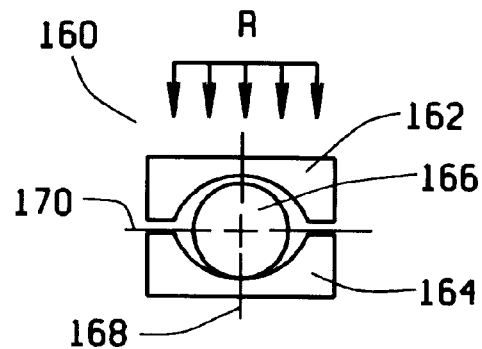
FIG. 2B is a schematic view of a well known bearing illustrating a radial preload.

FIG. 2B is a schematic view of a well known bearing 160 illustrating a radial preload force R. Bearing 160 includes an outer race 162, an inner race 164, and at least one ball 166. Bearing 160 also includes a contact axis 168 and a rotation axis 170. Since the only force acting on ball 166 is radial preload force R, contact axis 168 is substantially parallel to radial preload force R. In addition, rotation axis 170 is substantially perpendicular to radial preload force R.

Figure 2C:
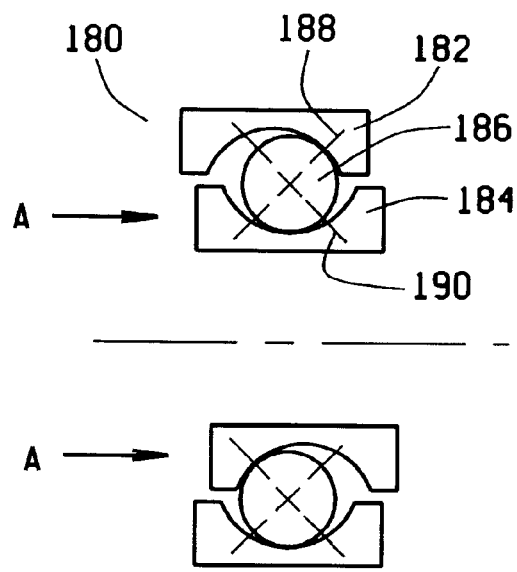
FIG. 2C is a schematic view of a well known bearing illustrating an axial preload.

FIG. 2C is a schematic view of a well known bearing 180 illustrating an axial preload force A. Bearing 180 includes an outer race 182, an inner race 184, and at least one ball 186. Bearing 180 also includes a contact axis 188 and a rotation axis 190. Since the only force acting on bearing 180 is axial preload force A, contact axis 188 has shifted from having only a radial component, to having a radial component and an axial component. Since contact axis 188 is angled relative to the radial direction, the application of axial preload force A maintains inner race 184 in contact with ball 186 that also contacts outer race 182. Axial preload force A is thus effective at maintaining contact between inner race 184, ball 186, and outer race 182.

Figure 3:
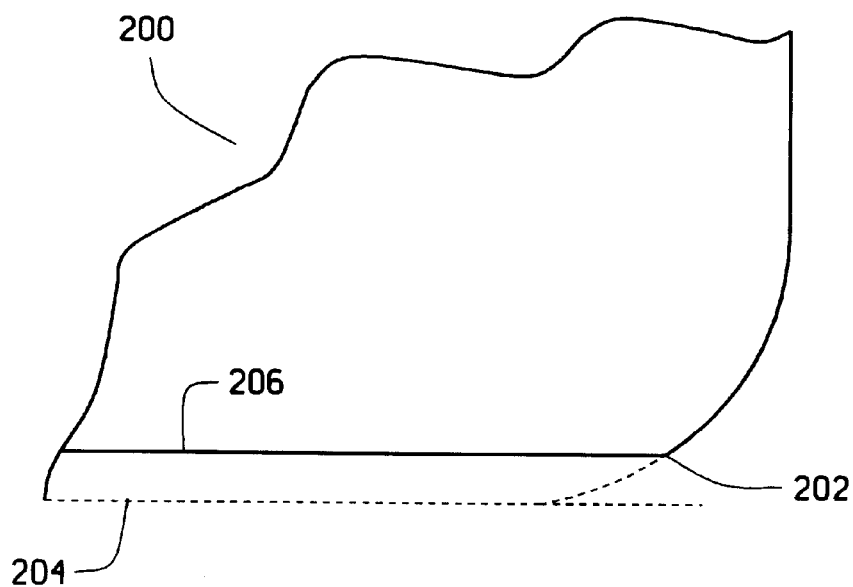
FIG. 3 is a partial schematic view of a well known bearing outer race profile.

FIG. 3 is a partial schematic view of a well known outer race 200 for a bearing (not shown) illustrating an edge 202. Outer race 200 is fabricated with an initial surface 204. During processing of outer race 200, surface 204 is machined and subjected to a final operation of grinding outer surface 204. This results in a finished surface 206 and edge 202 with a portion that is not tangent to finished surface 206.

Figure 4:
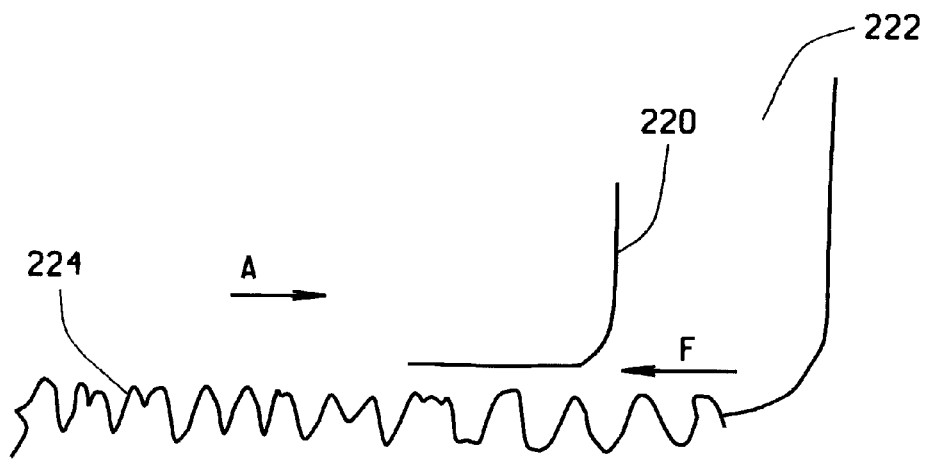
FIG. 4 is a partial schematic view of a well known bearing illustrating a bore surface with an initial surface finish.

FIG. 4 is a partial schematic view of an outer race 220 and a housing bearing bore 222 illustrating a bore surface 224 with an initial surface finish. A friction force F is present between outer race 220 and bearing bore 222 when an axial preload force A is exerted on outer race 220. Since a minimum axial preload force A is desired, and excessive axial preload force A leads to shortened bearing life, friction force F should be minimized. Friction force F includes a friction component and a sticking component. The friction component is primarily a function of the contacting materials and the normal forces acting on outer race 220 and bearing bore surface 224. The sticking component is reduced by reducing the surface roughness of bearing bore surface 224.

Two common methods of reducing surface roughness are grinding and plating. Reducing surface roughness may increase the friction component since the total contact area is increased. However, reducing the surface roughness is effective at reducing the sticking component at the edge of the bearing.

Figure 5:
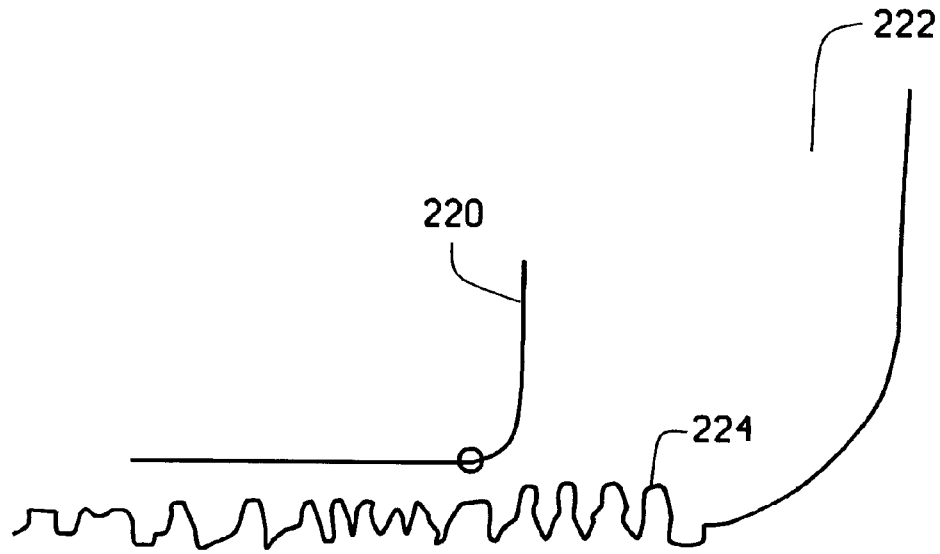
FIG. 5 is a partial schematic view of the bearing shown in FIG. 4 after a portion of the bore surface has been engaged by the outer race for an extended period of time.

FIG. 5 is a partial schematic view of housing bearing bore 222 after a portion of bore surface 224 has been engaged by outer race 220 for an extended period of time. During operation, thermal expansion and contraction in the axial direction will cause outer race 220 to slide axially with respect to bearing bore 222. The range of movement is dependent upon the temperature gradients and construction materials. Transferring axial preload force A across the bearing (not shown) also requires some small movement of outer race 220 in order to establish a contact point and axis (not shown) within the bearing. As outer race 220 slides in bearing bore 222, the portion of surface 224 that is in contact with outer race 220 will become polished with some reduction in surface roughness and an associated small change in diameter. This small change in diameter may actually create a small step or ledge that tends to increase the sticking force.

Figure 6:
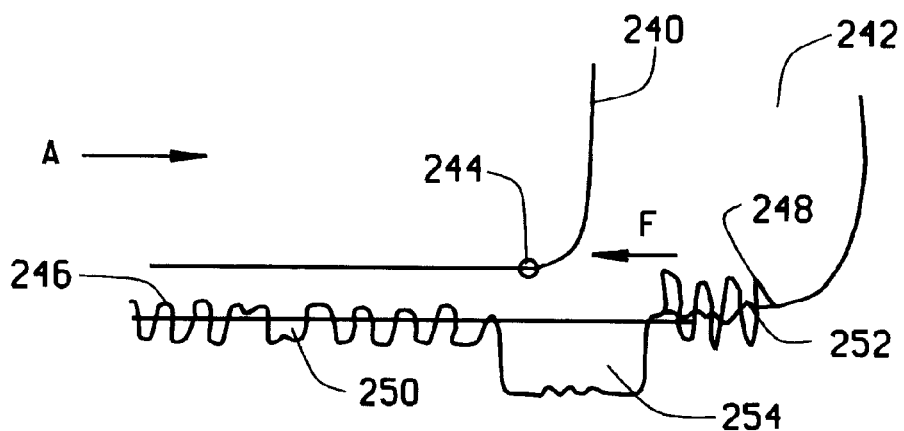
FIG. 6 is a partial schematic view of a bearing according to one embodiment of the present invention.

FIG. 6 is a partial schematic view of an outer race 240 and a housing bearing bore 242 in accordance with one embodiment of the present invention. Outer race 240 includes an edge 244, and bearing bore 242 includes a first bore surface 246 and a second bore surface 248. Bore surface 246 includes a plurality of cutting tool marks 250 formed from the machining of bore surface 246. As bore surface 246 rubs against outer race 240, cutting tool marks 250 are worn down. Bore surface 248 also includes a plurality of cutting tool marks 252 that are formed from the machining of bore surface 248. Unlike cutting tool marks 250, cutting tool marks 252 do not become worn because they are not in contact with outer race 240. Thus, bore surface 246 will be at a different height than bore surface 248.

One method for improving the movement of outer race 240 along bore surface 246 is to place a small relief cut 254 in bearing bore 242 at the locations of each outer race edge, e.g., 244. Relief cut 254 eliminates the edge sticking component by eliminating contact between bearing edge 244 and bore surface 246. Relief cut 254 is positioned so that outer race edge 244 does not contact bore surface 246 over the range of axial movement of outer race 240.

Relief cut 254 tends to increase the uniformity of loading between outer race 240 and bearing bore 242. Relief cut 254 eliminates loading of outer race edge 244 that can distort outer race 240 and lead to shortened bearing life. Contact pressures between outer race 240 and bore surface 246 are relatively unchanged due to the small size of relief cut 254 compared to the total contact area of bore surface 246 and outer race 240.

Figure 7:
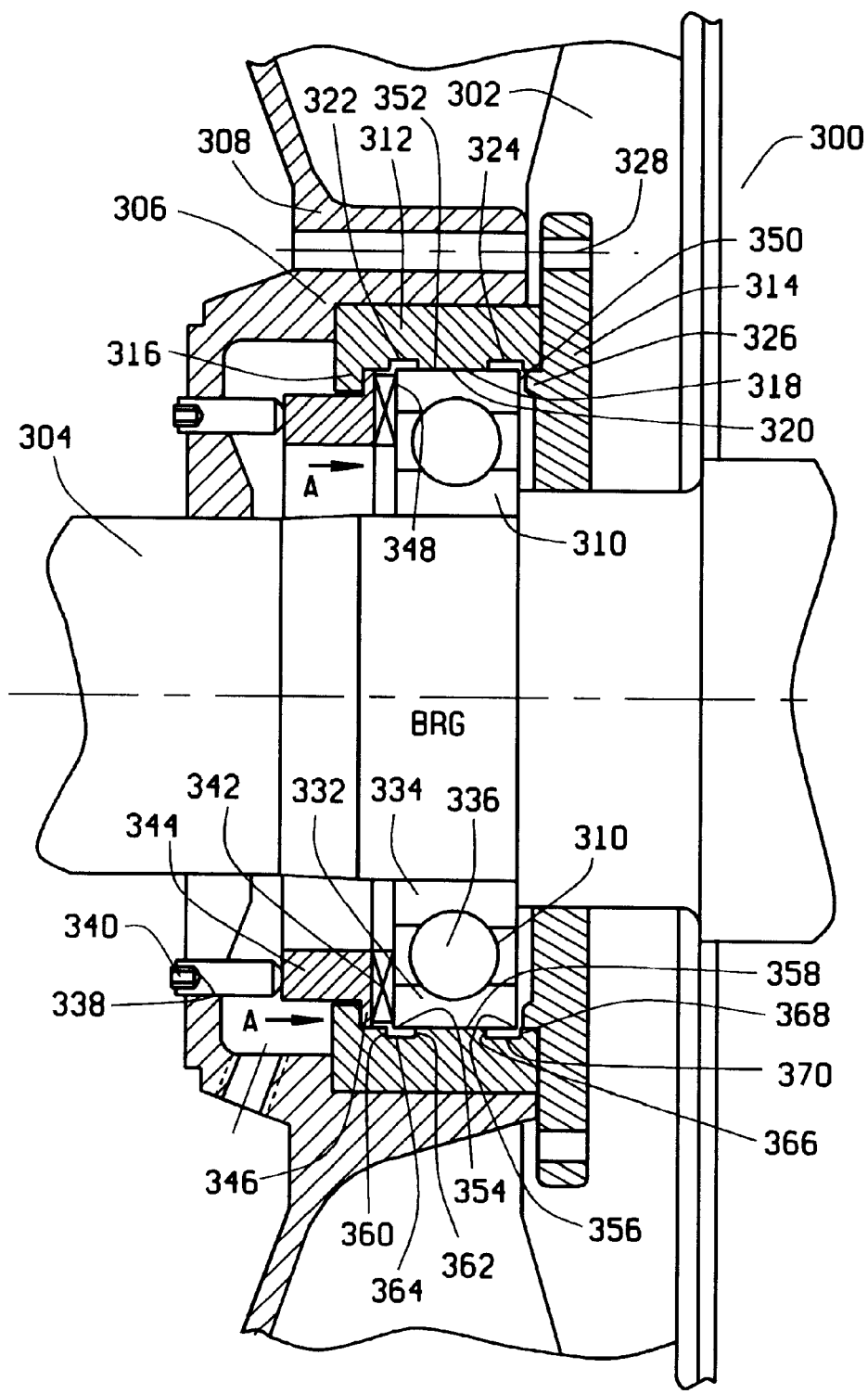
FIG. 7 is a partial schematic view of an electric motor including the bearing shown in FIG. 6.

FIG. 7 is a schematic view of a portion of an electric motor 300 that includes a motor housing (not shown). The motor housing includes a shell (not shown) with first and second ends (not shown), a first end shield 302 mounted to the first shell end and including an opening (not shown) therethrough, and a second end shield (not shown) mounted to the second shell end and including an opening (not shown) therethrough. Motor 300 also includes a rotor (not shown) including a rotor core (not shown) with a bore (not shown) extending through the core and a shaft 304 extending through the bore.

End shield 302 includes a bearing system 306 that, in one embodiment, is positioned at least partially within first end shield 302. Bearing system 306 also can be mounted to the outboard side of end shield 302. Bearing system 306 includes a bearing housing 308 and a bearing 310 positioned within bearing housing 308. Bearing housing 308 includes a sleeve 312 and a bearing cap 314. Sleeve 312 includes a lip 316 and a bearing bore 318 that includes a bore surface 320 having a pair of relief cuts 322, 324. Bearing cap 314 includes a lip 326 and an opening 328. Lip 326 cooperates with sleeve 312 to keep sleeve 312 properly positioned with respect to shaft 304. Opening 328 receives a bolt to position cap 314 with respect to end shield 302. Bearing housing 308, bearing sleeve 312, and bearing cap 314 can be formed individually. Alternatively, bearing housing 308, bearing sleeve 312, and bearing cap 314 can be formed unitarily with end shield 302. As another alternative, bearing cap 314, bearing sleeve 312, and bearing housing 302 can be formed unitarily and then positioned onto end shield 302.

Bearing 310 includes an outer race 332, an inner race 334, and at least one ball 336. Alternatively, bearing 310 could include at least one roller. Bearing housing 308 further includes an opening 338, an adjust screw 340, and a spring 342 that contacts outer race 332 and provides an axial preload force A on ball 336. Adjust screw 340 is positioned, at least partially, within opening 338, and extends through opening 338. In one embodiment, bearing system 306 includes four preload adjust screws 340. Of course, bearing system 306 could include as few as one screw 340 or more than four screws 340.

A preload adjust plate 344 is placed between adjust screw 340 and spring 342. Preload adjust plate 344 assists in establishing a stable contact between adjust screw 340 and spring 342. Adjust plate 344 includes a lip 346, that, in one embodiment, extends substantially radially away from shaft 304. In addition, bearing sleeve lip 316 extends substantially radially toward shaft 304. Adjust plate lip 346 is positioned on an inboard side of bearing sleeve lip 316 and cooperates with bearing sleeve lip 316 to assist in preventing adjust plate 344 from falling out of bearing system 306 even when adjust screw 340 is removed from opening 338. Adjust screw 340 can be manipulated to adjust the force preload spring 338 imparts to bearing 310. In one embodiment, adjust screw 340 is turned to provide more tension to spring 342. Spring 342 then contacts outer race 332 and moves outer race 332 into contact with ball 336. Ball 336 is then moved into contact with inner race 334.

Motor 300 further includes a stator (not shown) that is mounted in the motor housing and a bore extending through the stator. Substantially straight rotor shaft 304 is rotatably mounted in the motor housing and extends through the stator ore, the rotor bore, end shield 302, and bearing system 306. Bearing 310 rotatably supports shaft 304.

Outer race 332 includes a first edge 348, a second edge 350, and a connecting portion 352. First edge 348 intersects connecting portion 352 at a first corner 354, and second edge 350 intersects connecting portion 352 at a second corner 356. In addition, bore surface 320 includes an intermediate portion 358. Outer race 332 is positioned so that intermediate portion 358 contacts outer race connecting portion 352, first edge 348 is positioned adjacent relief cut 322, and second edge 350 is positioned adjacent second relief cut 324. In one embodiment, first relief cut 322 includes a first side 360, a second side 362, and a bottom surface 364, and second relief cut 324 includes a first side 366, a second side 368, and a bottom surface 370. First edge 348 and first corner 354 are positioned between first side 360 and second side 362 of first relief cut 322. In addition, second edge 350 and second corner 354 are positioned between first side 366 and second side 368 of second relief cut 324. This positioning prevents edges 322, 324 from contacting bore surface 320.

In operation, screw 340 extends through opening 338 and contacts preload plate 344. Preload plate 344 then compresses spring 342. Compressed spring 342 increases the preload force applied to outer race 332. The force from spring 342 then causes outer race 332 to move axially along shaft 304. This axial movement causes outer race 332 to slide along bore surface 320 which results in a polishing of bore surface 320. Since edges 348, 350 are not in contact with bore surface 320, they do not increase the friction force caused by movement of outer race 332 along bore surface 320.

Bearing system 306 is assembled by first positioning bearing 310 onto rotor shaft 302. Preload adjust plate 344, preload screw 340, and preload spring 342 are positioned onto end shield 302. Rotor shaft 302 is then positioned through the opening on end shield 302 until bearing 310 is adjacent an outboard side of end shield 302. Preload spring 342 is then adjusted until spring 342 contacts bearing 310 and provides the desired axial preload force A to bearing 310. In one embodiment, preload adjust screw 340 is positioned to extend through bearing housing opening 338. Preload adjust screw 340 is then turned until the desired axial preload force A is applied to spring 342. Axial preload force A is transmitted from screw 340 to spring 342 and then to outer race 332. Axial preload force A is then transmitted to ball 336 and then to inner race 334. The rotor is further positioned to align first relief cut 322 with first edge 348, and second relief cut 324 with second edge 350.

Figure 8:
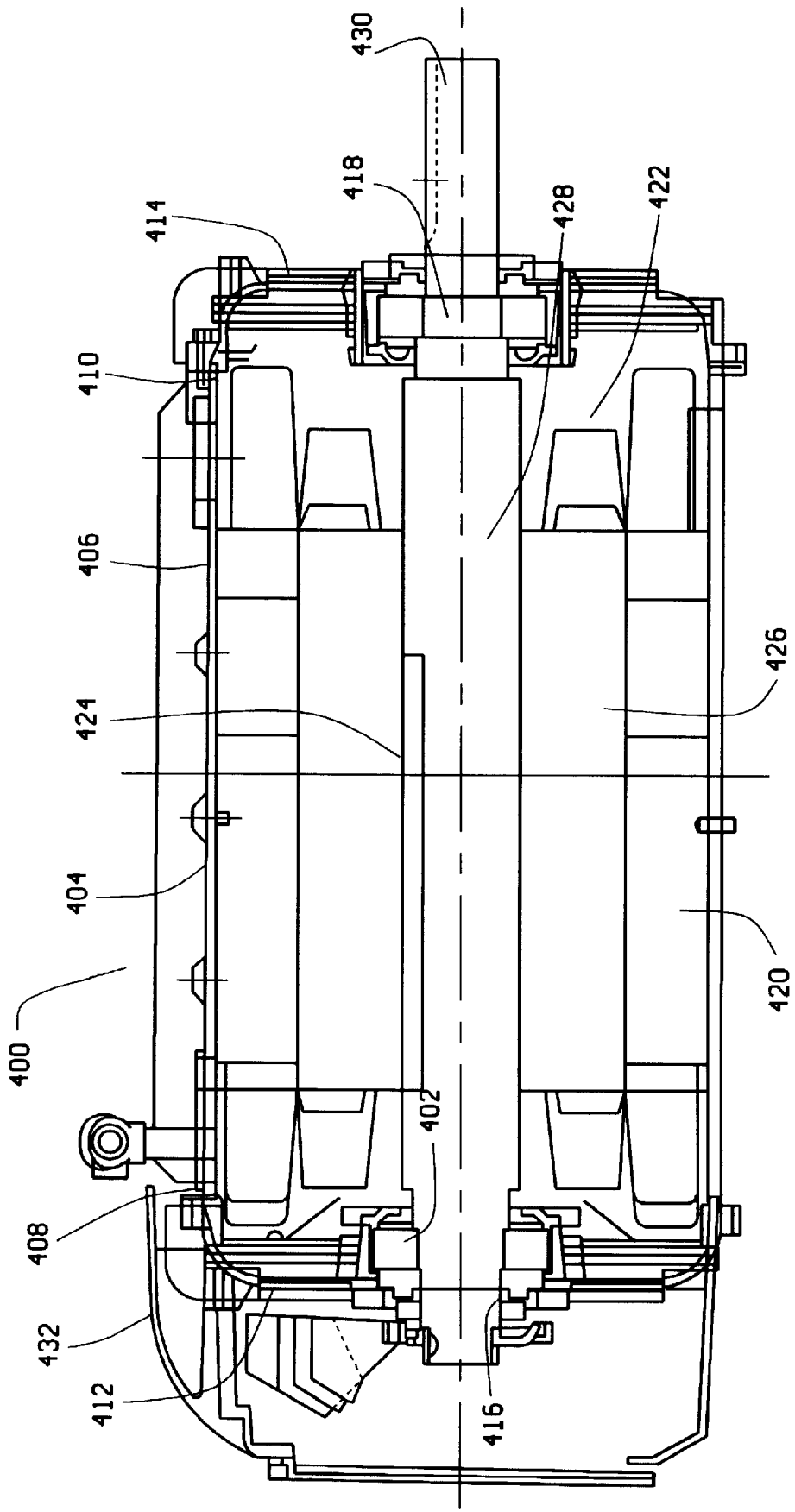
FIG. 8 is a schematic view of an electric motor including a bearing according to another embodiment.

FIG. 8 is a schematic view of an electric motor 400 including another embodiment of a bearing system 402, described below in more detail. Motor 400 includes a housing 404 having a shell 406 with a first end 408 and a second end 410. A first end shield 412 is mounted to first end 408 and a second end shield 414 is mounted to second end 410. A first opening 416 extends through first end shield 412 and a second opening 418 extends through second end shield 414. Motor 400 also includes a stator 420 having a bore 422 therethrough. Stator is connected to housing 404. A rotor 424 extends through stator bore 422 and includes a rotor core 426. A rotor bore 428 extends through rotor core 426. A rotor shaft 430 is rotatably mounted in housing 404 and extends through rotor bore 428 and through first opening 416 and second opening 418 in end shields 412, 414 respectively. A cover 432 is mounted to first end shield 412.

Figure 9:
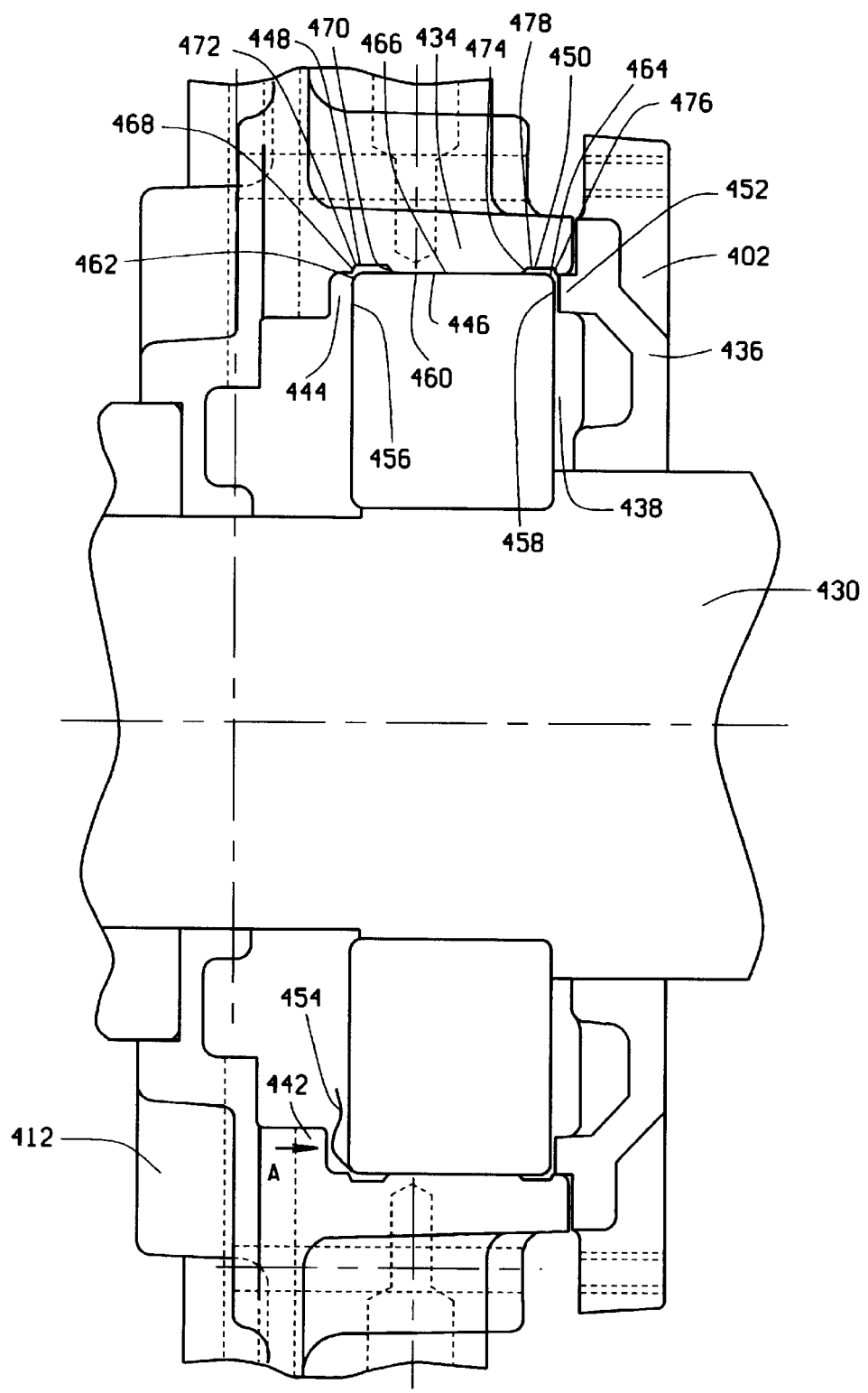
FIG. 9 is a partial schematic view of the bearing shown in FIG. 8.

FIG. 9 is a partial schematic view of bearing system 402, end shield 412, and rotor shaft 430. In one embodiment, bearing system 402 is positioned, at least partially, within end shield 412. Alternatively, bearing system 402 could be mounted to an outboard side of end shield 412. Bearing system 402 includes a sleeve 434 and a bearing cap 436 forming a cavity 438. A bearing 440 is positioned within cavity 438 formed by sleeve 434 and bearing cap 436. Sleeve 434 includes a shoulder, or step, 442 and a bearing bore 444 that includes a bore surface 446 having a pair of relief cuts 448, 450. Bearing cap 436 includes a lip 452 that cooperates with sleeve 434 to maintain sleeve 434 properly positioned with respect to shaft 430. Bearing sleeve 434 and bearing cap 436 can be fabricated individually. In another embodiment, bearing sleeve 434 and bearing cap 436 are formed unitarily with end shield 412. Alternatively, bearing cap 436 and bearing sleeve 434 can be formed unitarily, and then positioned onto end shield 412.

Bearing 440 includes and outer race (not shown), an inner race (not shown), and at least one ball (not shown). Alternatively, bearing 440 could include at least one roller. Bearing system 402 further includes at least one spring 454 that contacts the outer race of bearing 440. Spring 454 provides an axial preload force A on the ball. Spring 454 is also in contact with shoulder 442 of sleeve 434 that provides axial support for spring 454. Spring 454 is compressed between shoulder 442 and bearing 440 which causes preload axial force A to be exerted on bearing 440. In one embodiment, spring 454 is a wave spring, or a bearing preload spring washer. Alternatively, spring 454 could be any type of spring that fits within the space between shoulder 442 and bearing 440, such as a coil spring.

Bearing 440 includes a first edge 456, a second edge 458, and a connecting portion 460. First edge 456 intersects connecting portion 460 at a first corner 462, and second edge 458 intersects connecting portion 460 at a second corner 464. In addition, bore surface 446 includes an intermediate portion 466. Bearing 440 is positioned so that intermediate portion 466 contacts bearing connecting portion 460. In addition, first edge 456 is positioned adjacent first relief cut 448, and second edge 458 is positioned adjacent second relief cut 450. In one embodiment, first relief cut 448 includes a first side 468, a second side 470, and a bottom surface 472. Second relief cut 450 includes a first side 474, a second side 476, and a bottom surface 478. First edge 456 and first corner 462 are positioned between first side 468 and second side 470 of first relief cut 448. In addition, second edge 458 and second corner 464 are positioned between first side 474 and second side 476 of second relief cut 450. This positioning prevents edges 456, 458 from contacting bore surface 446.

Minimizing bearing noise over the entire operating range includes maintaining a minimum axial preload on the bearing. However, since the sticking component of the friction force will be somewhat random in nature, axial preload force A should be set high enough to account for the worst case of sticking and still supply the minimum bearing preload force. At times when the sticking is not present or not at the worst case level, the axial preload force will be higher than necessary. Thus, eliminating the edge sticking force results in a lower axial preload force over the operating range of the bearing system. Lowering the axial preload forces leads to increased bearing life. In addition, the use of relief cuts reduce the misalignment of bearings due to localized sticking of the bearing on the bore surface.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A bearing system comprising:
    a bearing housing including an opening and a bearing bore with a surface having at least one relief cut;
    at least one bearing configured to support a rotatable shaft, said bearing positioned within said bearing bore and including an inner race, an outer race, and at least one ball, said outer race comprising a first edge, a second edge, and a connecting portion extending therebetween, at least one of said first edge and said second edge positioned at said at least one relief cut; and
    means for applying an axial preload to said bearings.

2. A bearing system in accordance with claim 1 wherein said axial preload means comprises a spring that contacts said outer race.

3. A bearing system in accordance with claim 2 wherein said axial preload means further comprises an adjust screw for adjusting the tension in said spring, said adjust screw extending through said housing opening.

4. A bearing system in accordance with claim 3 wherein said axial preload means further comprises an adjust plate positioned between said adjust screw and said spring.

5. A bearing system in accordance with claim 2 wherein said housing further comprises a shoulder, said spring contacting said shoulder such that when the bearing system is fully assembled, the preload spring is compressed sufficiently to provide the predetermined pre-load force.

6. A bearing system in accordance with claim 1 wherein said at least one relief cut comprises a first relief cut, a second relief cut, and an intermediate portion, said first relief cut positioned adjacent said first edge, and said second relief cut positioned adjacent said second edge.

7. A bearing system in accordance with claim 6 wherein each of said first and second relief cuts comprise a first side and a second side, said first edge positioned between said first and second sides of said first relief cut and said second edge positioned between said first and second sides of said second relief cut.

8. A bearing system in accordance with claim 6 wherein said outer race connecting portion is adjacent said bore surface intermediate portion, said connecting portion contacts said intermediate portion.

9. A bearing system comprising:
   a bearing housing including an opening and a bearing bore with a surface having at least one relief cut;
   a bearing configured to support a rotatable shaft, said bearing positioned within said bearing bore and including an inner race, an outer race, and a plurality of balls;
   a spring contacting said outer race for supplying a predetermined preload force to said outer race; and
   an adjust screw extending through said housing opening.

10. A bearing system in accordance with claim 9 wherein said screw for adjusting tension in said spring.

11. A bearing system in accordance with claim 10 further comprising an adjust plate positioned between said adjust screw and said spring, said adjust plate for establishing contact between said adjust screw and said spring.

12. A bearing system in accordance with claim 11 wherein said adjust plate comprises a lip, said bearing housing further comprises:
   a bearing sleeve including a lip, said bearing sleeve adjacent said outer race, said bearing sleeve lip cooperating with said adjust plate lip to maintain said adjust plate within said housing; and
   a bearing cap including a lip, said bearing cap lip cooperating with said bearing sleeve to properly position said bearing sleeve.

13. A bearing system in accordance with claim 9 wherein said housing further comprises a shoulder, said spring positioned between said outer race and said shoulder such that when said bearing system is fully assembled, the pre-load spring is compressed sufficiently to provide the predetermined pre-load force.

14. A bearing system in accordance with claim 12 wherein said outer race comprises a first edge, a second edge, and a connecting portion, and said at least one relief cut comprises a first relief cut, a second relief cut, and an intermediate portion, said first relief cut adjacent said first edge, said second relief cut adjacent said second edge, and said outer race connecting portion adjacent said bore surface intermediate portion.

15. An electric motor assembly comprising:
   a motor housing comprising a shell with first and second ends, a first end shield mounted to said first shell end, and a second end shield mounted to said second shell end;
   a rotor comprising a rotor core having a bore therethrough and a substantially straight shaft extending through said rotor core bore;
   a bearing system including a bearing housing comprising a bearing bore including a surface with at least one relief cut, a bearing configured to support said rotor shaft, a spring contacting said bearing assembly and providing an axial preload on said bearing, said bearing comprising an outer race, an inner race, and at least one ball, said bearing system positioned at least partially within said first end shield, said outer race comprising a first edge, a second edge, and a connecting portion extending therebetween, at least one of said first edge and said second edge positioned at said at least one relief cut; and
   a stator mounted in the housing and comprising a bore therethrough, said rotor rotatably mounted in said housing and extending through said stator bore, said shaft rotatably supported by said bearing.

16. An electric motor assembly in accordance with claim 15 further comprising an adjust screw for adjusting tension in said spring.

17. An electric motor assembly in accordance with claim 16 wherein said bearing system further comprises an adjust plate positioned between said spring and said adjust screw.

18. An electric motor assembly in accordance with claim 15 wherein said housing further comprises a shoulder contacting said spring, said shoulder configured to compress said spring to provide the axial preload.

19. An electric motor assembly in accordance with claim 16 wherein said bearing housing further comprises an adjust screw opening, said adjust screw positioned, at least partially, within said adjust screw opening.

20. An electric motor assembly in accordance with claim 15 wherein said at least one relief cut comprises a first relief cut, a second relief cut, and an intermediate portion, said outer race positioned so that said intermediate portion contacts said connecting portion, said first edge is adjacent said first relief cut, and said second edge is adjacent said second relief cut.

21. An electric motor assembly in accordance with claim 15 wherein said spring is configured to contact and move said outer race of said bearing assembly, said spring for adjusting the preload in said bearing assembly.

* * * * *

UNITED STATES PATENT AND TRADEMARK OFFICE
CERTIFICATE OF CORRECTION

PATENT NO. : 6,123,462
DATED : September 26, 2000
INVENTOR(S) : James R. Crowell It is certified that error appears in the above-identified patent and that said Letters Patent is hereby corrected as shown below:

<u>Column 6,</u>
Line 47, delete "ore" and substitute with -- bore --.

Signed and Sealed this

Twenty-fifth Day of September, 2001

*Attest:*

*Nicholas P. Godici*

*Attesting Officer*

NICHOLAS P. GODICI
*Acting Director of the United States Patent and Trademark Office*